United States Patent
Twu et al.

(10) Patent No.: US 11,633,997 B2
(45) Date of Patent: Apr. 25, 2023

(54) SUSPENSION SYSTEM PROVIDING DESIRED WHEEL KINEMATICS AT PRESCRIBED CONDITIONS

(71) Applicant: GM GLOBAL TECHNOLOGY OPERATIONS LLC, Detroit, MI (US)

(72) Inventors: Sung-ling Twu, Troy, MI (US); Ferdous M Z Ghazi, Troy, MI (US); Fred M. Marquardt, Commerce, MI (US); Zohir Molhem, Rochester Hills, MI (US); Leonid Peschansky, West Bloomfield, MI (US); Dean Matthew Perelli, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/445,150

(22) Filed: Aug. 16, 2021

(65) Prior Publication Data
US 2023/0053025 A1 Feb. 16, 2023

(51) Int. Cl.
*B60G 7/00* (2006.01)
*B62D 7/18* (2006.01)

(52) U.S. Cl.
CPC ............. *B60G 7/001* (2013.01); *B60G 7/005* (2013.01); *B60G 7/008* (2013.01); *B62D 7/18* (2013.01); *B60G 2204/416* (2013.01); *B60G 2204/43* (2013.01)

(58) Field of Classification Search
CPC .......... B60G 7/001; B60G 7/008; B60G 7/02; B60G 2204/147; B60K 5/1241
See application file for complete search history.

(56) References Cited

U.S. PATENT DOCUMENTS

| | | | | |
|---|---|---|---|---|
| 9,561,700 | B2* | 2/2017 | Kraschienski | B60G 7/02 |
| 9,688,315 | B2* | 6/2017 | Peschansky | B62D 25/2009 |
| 10,023,018 | B2* | 7/2018 | Saudemont | B62D 21/155 |
| 10,150,344 | B2* | 12/2018 | Larsson | B60G 7/02 |
| 10,766,326 | B2* | 9/2020 | Hata | B62D 21/15 |
| 10,822,027 | B2* | 11/2020 | Karlsson | B62D 7/18 |
| 11,465,684 | B2* | 10/2022 | Okamoto | B60G 7/02 |

(Continued)

OTHER PUBLICATIONS

U.S. Appl. No. 17/444,393 Vehicle Suspension System Architecture for Minimized Small Overlap Frontal Impact Effects, filed Aug. 4, 2021.

*Primary Examiner* — Paul N Dickson
*Assistant Examiner* — Tiffany L Webb
(74) *Attorney, Agent, or Firm* — Lorenz & Kopf LLP (57) ABSTRACT

Systems are provided for suspensions that deliver desirable wheel kinematics at prescribed conditions. A system includes a vehicle body structure with an engine cradle, and an associated wheel assembly. A suspension system links the wheel assembly with the engine cradle, and includes a link coupled with the engine cradle and coupled with the wheel assembly. A joint at the link includes a flange that has an opening, an edge, and at least one undercut defined in edge of the flange. The joint allows release of the wheel assembly from the engine cradle by designed tearing between the opening and the at least one undercut. The release is initiated only under loads above a select threshold at the joint, to provide select kinematics of the wheel assembly for specific operational cases.

20 Claims, 7 Drawing Sheets

(56) References Cited

U.S. PATENT DOCUMENTS

2002/0180171 A1* 12/2002 Hasebe .................... B60G 7/02
280/124.134
2015/0329143 A1* 11/2015 Fujita ....................... B60G 7/02
280/784

* cited by examiner

SUSPENSION SYSTEM PROVIDING DESIRED WHEEL KINEMATICS AT PRESCRIBED CONDITIONS

INTRODUCTION

The present disclosure generally relates to the field of vehicle suspension systems and more specifically, to suspension systems providing desired wheel kinematics for minimized effects under prescribed conditions such as small frontal overlap impacts.

Suspension systems of apparatus such as vehicles and other equipment and machinery, enabling relative movement between masses of the apparatus. During the enabled movement, the suspension system provides structural integrity and oscillation damping for purposes such as to provide stability, reduce vibration transmission, and deliver preferred response characteristics. Suspension systems may include dampers and springs that act between the sprung (vehicle body) and unsprung (wheel assembly) masses of the apparatus. It is desirable to provide an economical and fast responding suspension system that delivers performance characteristics that instantaneously manage road and other inputs in predictable ways. In addition, the mass of vehicle components contributes to the ability to deliver economical operation, and so lower mass components that deliver the required performance is generally desirable.

Various types of suspension systems may be used and each generally includes linked connections between components, such as between the sprung and the unsprung masses of the vehicle. In the case of vehicle applications, during operation the vehicle and/or its wheels may encounter a variety of surfaces and objects that impart loads on and through the suspension system. Suspensions are generally designed to meet various requirements related to performance, durability and linked joint integrity. As a result, the performance of the vehicle, including the suspension system, in response to the various loads and conditions that may be encountered is evaluated during product development. A number of simulations may be conducted to evaluate the vehicle's performance such as a moderate overlap frontal test (MOF), a small overlap frontal test (SOF), a curb abuse load test (CAL), and others. These tests are conducted to simulate conditions such as impacts with other vehicles or with objects such as a barrier or a curb. Minimized effects with predictable outcomes at prescribed conditions resulting from these impacts is preferred.

Accordingly, it is desirable to provide a suspension system that results in the minimization of the effects of impact loads. In addition, predictable wheel kinematics at prescribed conditions is preferred. Furthermore, other desirable features and characteristics of the present invention will become apparent from the subsequent detailed description and the appended claims, taken in conjunction with the accompanying drawings and the foregoing technical field and background.

SUMMARY

Systems are provided for suspensions that deliver desirable wheel kinematics at prescribed conditions. In various embodiments, a system includes a vehicle body structure that may include an engine cradle and includes an associated wheel assembly. A suspension system links the wheel assembly with the vehicle body structure, and includes a link coupled with the engine cradle and coupled with the wheel assembly. A joint at the link includes a flange that has an opening, an edge, and at least one undercut defined in edge of the flange. The joint is configured to release the wheel assembly from the engine cradle by designed tearing between the opening and the undercut(s). The release may be partial or complete and may be initiated only under loads above a select threshold at the joint, to provide select kinematics of the wheel assembly for select operational cases.

In additional embodiments, the link may be embodied as a lower control arm configured to control movement of the wheel assembly relative to the vehicle body structure in both a longitudinal direction and a lateral direction.

In additional embodiments, the undercut(s) include a notch-like contour in the edge of the flange defined by an arc section and a substantially straight section.

In additional embodiments, a steering knuckle may be connected between the wheel assembly and the link, wherein the second joint is a ball joint at the steering knuckle and the threshold angle may be a selected angle, such as approximately fifty-degrees relative to a longitudinal direction of the vehicle body structure.

In additional embodiments, a bracket may be in the vehicle body structure, such as at the engine cradle. The bracket may include the flange as a forward flange defining the opening as a first opening, and the bracket may include a rearward flange defining a second opening. The rearward flange may have an outer edge that is substantially straight.

In additional embodiments, the edge of the forward flange may have an outboard end and a tear-out section between the first opening and the outboard end. The tear-out section may be configured to tear from the forward flange when subjected to the loads above the threshold force and above the threshold angle.

In additional embodiments, a rocker may be included in the vehicle body structure. The select kinematics may provide for directing the wheel assembly through a trajectory that is directed at the rocker.

In additional embodiments, the link may be configured to buckle under the loads when the loads are greater than a buckling force of the link, and when the loads are also directed at angles, relative to a vehicle longitudinal direction, of less than the threshold angle.

In additional embodiments, the at least one undercut may comprise a first undercut and a second undercut. The two undercuts may be mirror-images of each other.

In additional embodiments, the first undercut may include an arc section defined about a point that is disposed at an angle relative to a centerline of the opening. The angle may be selected to effect the tearing when subjected to the loads above the select threshold at the joint.

In a number of other embodiments, a vehicle body structure and an associated wheel assembly are linked by a suspension system. The suspension system may include a link coupled with the vehicle body structure by a first joint and coupled with the wheel assembly through a second joint. The first joint may include a flange that has an opening, an edge, and at least one undercut defined in the edge of the flange. The first joint may be configured to release the link from the vehicle body structure under loads on the wheel assembly above a select threshold, that may include a threshold force and a threshold angle of the threshold force at the second joint. The release is configured to impart select kinematics to the wheel assembly including directing the wheel assembly through a trajectory selected to minimize deformation of the vehicle body structure.

In additional embodiments, the link comprises a lower control arm configured to control movement of the wheel assembly relative to the vehicle body structure in both a longitudinal direction and a lateral direction. The lower control arm may be coupled to the vehicle body at the first joint and at a third joint.

In additional embodiments, the undercut may comprise a notch-like contour in the edge of the flange and may be defined by an arc section and a substantially straight section. The undercut leaves an area of material of the flange between the opening and the edge. The bushing may be coupled to the flange and may be concealed behind the flange by the area of material.

In additional embodiments, the second joint may be a ball joint enabling the wheel assembly to turn relative to the vehicle body. The threshold angle may be a selected angle, such as fifty-degrees relative to a longitudinal direction of the vehicle body structure.

In additional embodiments, a bracket may be included in the vehicle body structure. The bracket may include the flange as a forward flange that defines the opening. The bracket may include a rearward flange that defines another opening. The rearward flange may include an outer edge that is substantially straight. When loads exceed the select threshold, the bracket is configured to tear both the forward flange and the rearward flange.

In additional embodiments, the edge of the forward flange includes an upper end at the undercut, a lower end at the undercut, and a tear-out section between the first opening and the undercut. The tear-out section is configured to tear from the opening to the edge between the upper end and the lower end, when subjected to the loads above the threshold force and above the threshold angle.

In additional embodiments, a rocker is included in the vehicle body structure. The select kinematics include directing the wheel assembly through a trajectory that is directed in a vehicle longitudinal direction and at the rocker.

In additional embodiments, the link is configured to buckle under the loads without the release of the link, when the loads are greater than a buckling force of the link, and when the loads are also directed at angles, relative to a vehicle longitudinal direction, of less than a threshold angle.

In additional embodiments, the undercut comprises two undercuts. The two undercuts are spaced apart by a vertical distance across a centerline of the opening. At least one of the two undercuts includes an arc section defined about a point that is disposed at an angle relative to the centerline of the opening. The angle is selected to effect the tearing under the loads above the select threshold at the joint.

In a number of further embodiments, a vehicle body structure includes an engine cradle, a rocker and a bracket. A wheel assembly is linked with the vehicle body structure at the engine cradle. A suspension system links the wheel assembly to the vehicle body structure, and includes a link coupled with the engine cradle at the bracket by one joint and coupled with the wheel assembly through another joint. The bracket includes a flange with an opening and an outer edge spaced from the opening, where the opening is defined about a center. The outer edge includes one undercut disposed above the center and another undercut spaced from the first undercut and disposed below the center. The joint at the bracket is configured to release, by tearing of the flange, the link from the engine cradle under loads on the wheel assembly above a threshold force and above a threshold angle of the threshold force at the second joint. The release is configured to impart select kinematics to the wheel assembly, including directing the wheel assembly through a trajectory toward the rocker to minimize deformation of the vehicle body structure.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

As disclosed herein, systems are provided that deliver a suspension architectural strategy for providing desirable wheel kinematics under prescribed conditions. In various embodiments, desirable performance outcomes are accomplished by a system that includes a set of features that permit a suspension link such as a lower control arm (LCA) to separate from the vehicle body structure connection (such as at an engine cradle) at prescribed conditions in predictable ways. This achieves desirable wheel kinematics for specific cases while maintaining suspension structural integrity for all other load cases. In most load cases, there is no joint slippage, and in those cases increasing loads cause the LCA to buckle under large loads directed at less than specified angles at the ball joint relative to the vehicle's longitudinal direction, while the integrity of the joint is maintained. In specific impact cases with substantial loads, the LCA is designed to at least partially separate from the vehicle body structure leading to desirable wheel kinematics. The desirable wheel kinematics may include directing the wheel to move in a direction toward a specific structural area of the vehicle to absorb impacts with minimal vehicle body deformation. The delivered architectural solution strategy minimizes complexity related to variations, such as due to wheel styling, that may arise downstream in the development cycle. Advantageously, wheel kinematics are desirably controlled without significant mass increases in the vehicle body structure. For example, mass increases would otherwise be associated with structural strength increases at other areas of the vehicle body.

In various embodiments, a system that delivers desirable wheel kinematics includes linking between a wheel assembly and a vehicle body structure that includes a link coupled with the vehicle body and coupled with the wheel assembly. A joint at the link includes a flange that has an opening, an edge, and at least one undercut defined in edge of the flange. The joint may couple the link with the vehicle body or with the wheel assembly. The joint is configured to at least partially release the wheel assembly from the vehicle body by tearing between the opening and the at least one undercut. The wheel assembly is released in a predictable manner from the vehicle body structure under loads above a select threshold at the joint, to provide select kinematics of the wheel assembly. In a number of embodiments, a bolt may extend through the opening and the link and securely holds the joint together under all operating conditions other the prescribed conditions. Beneficial results may include minimization of deformation of the vehicle body structure, by guiding the wheel's trajectory into a high strength area such as the vehicle's rocker. Performance is tunable, including by optimizing the flange's shape and geometry, the material grades, and the material gages.

Figure 1:
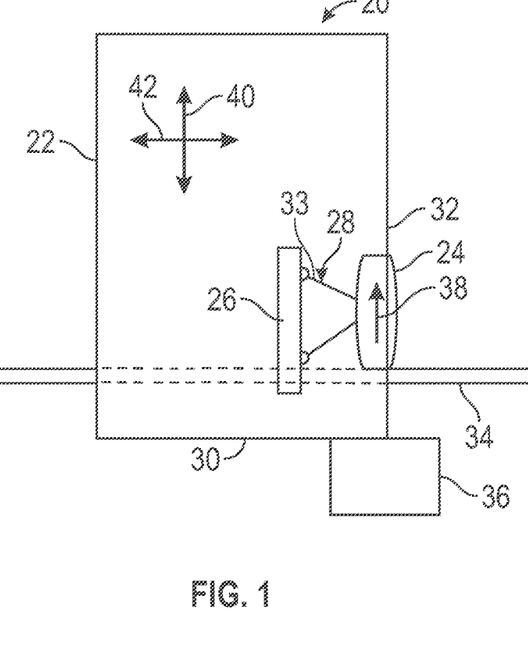
FIG. 1 is a schematic illustration of a vehicle undergoing various tests, in accordance with various embodiments.

Referring to FIG. 1, scenarios related to a vehicle 20 are schematically illustrated. In general, the vehicle 20 includes a body structure 22, a wheel assembly 24, and a suspension system 28 linking the wheel assembly 24 with the body structure 22. In the current embodiment, the suspension system 28 is connected with a structural element of the body structure 22 and specifically an engine cradle 26. The vehicle 20 includes a front end 30, and accordingly the wheel assembly 24 is a front wheel. It will be appreciated that the current disclosure is not limited to any particular wheel location and is applicable to any wheel of a vehicle 20. The body structure 22 includes a rocker 32 located rearward from the wheel assembly 24. The suspension system 28 includes a number of elements including a link 33 in accordance with various embodiments. As noted above, various metrics/tests may be conducted and evaluated to assess the performance of the vehicle 20 under various case scenarios.

The vehicle 20 may be operated over a wide range of conditions and situations that may be considered in advance during product development. In the real world, the wheel assembly 24 may encounter a variety of irregular surfaces and objects, such as an object 34. For example, the object 34 may be a curb along the edge of a roadway. If the wheel assembly 24 where to encounter the object 34, loads will be experienced, during which the suspension system 28 is designed to withstand the loads and remain intact and functional. One tool in assessing the performance of the vehicle 20 including the suspension system 28 in such a scenario is the CAL, which simulates the vehicle 20 driving over the curb/object 34.

Other real world operational scenarios of the vehicle 20 may include impacts such as by the front end 30 with an object 36. The object 36 may be another vehicle or a barrier of a variety of types that may exist along roadways. In some such scenarios, it has been found that enabling separation of the link 33 from the engine cradle 26 is beneficial for delivering desirable wheel kinematics. For example, separation of the link 33 may direct the wheel assembly 24 through a trajectory 38 directed at the rocker 32. This minimizes damage to the body structure 22 since the rocker 32 exhibits high strength, particularly in the longitudinal direction 40 of the vehicle 20, which direction the trajectory 38 generally matches. The longitudinal direction 40 is directed front-to-back of the vehicle 20. The lateral direction 42 of the vehicle 20 is perpendicular to the longitudinal direction 40 and is directed cross-car (side-to-side). Another tool in assessing the performance of the vehicle 20 including the suspension system 28 in such a scenario is the SOF, which simulates the vehicle 20 driving into, or otherwise encountering, the offset object 36.

Figure 2:
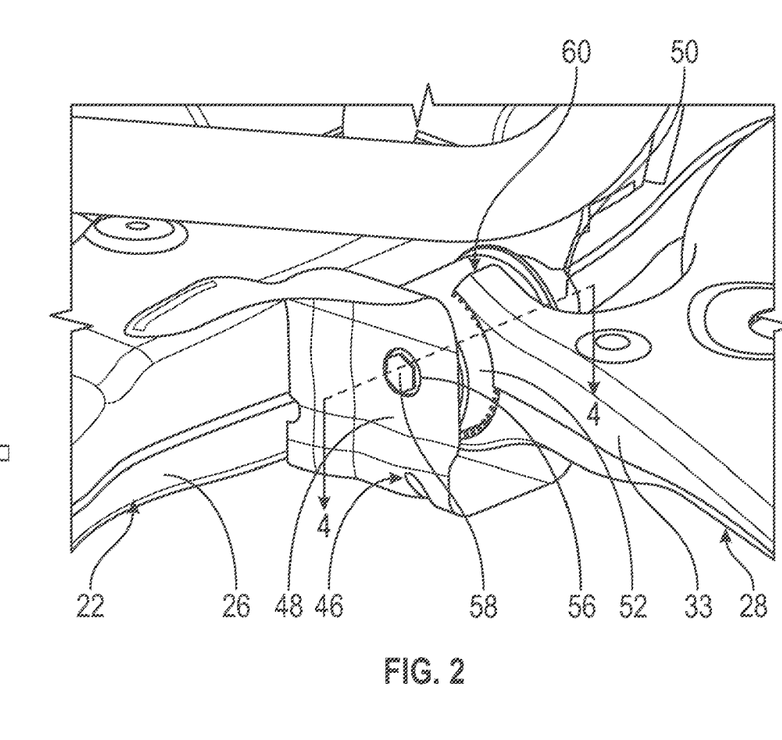
FIG. 2 is a perspective illustration of a lower control arm joint of the vehicle of FIG. 1, in accordance with various embodiments.

Referring to FIG. 2, the suspension system 28 includes the link 33, which in this case is embodied as a part of a LCA. A bracket 46 is connected with the engine cradle 26 of the body structure 22. The bracket 46 includes a forward flange 48 and a rearward flange 50. The link 33 includes a sleeve 52 that is disposed between the forward flange 48 and the rearward flange 50. A bushing 54 is disposed in the sleeve 52 and an opening 56 is provided in the forward flange 48. In this embodiment, the bushing 54 includes a resilient material and is a mounted in the suspension system 28 to absorb displacements, control the amount of movement in the joint 60 and reduce noise and vibration. A bolt 58 extends through the forward flange 48, the bushing 54, and the rearward flange 50, coupling the link 33 with the engine cradle 26 at the joint 60. In other embodiments, the joint 60 may be disposed at the coupling between the link 33 and the wheel assembly 24.

Figure 3:
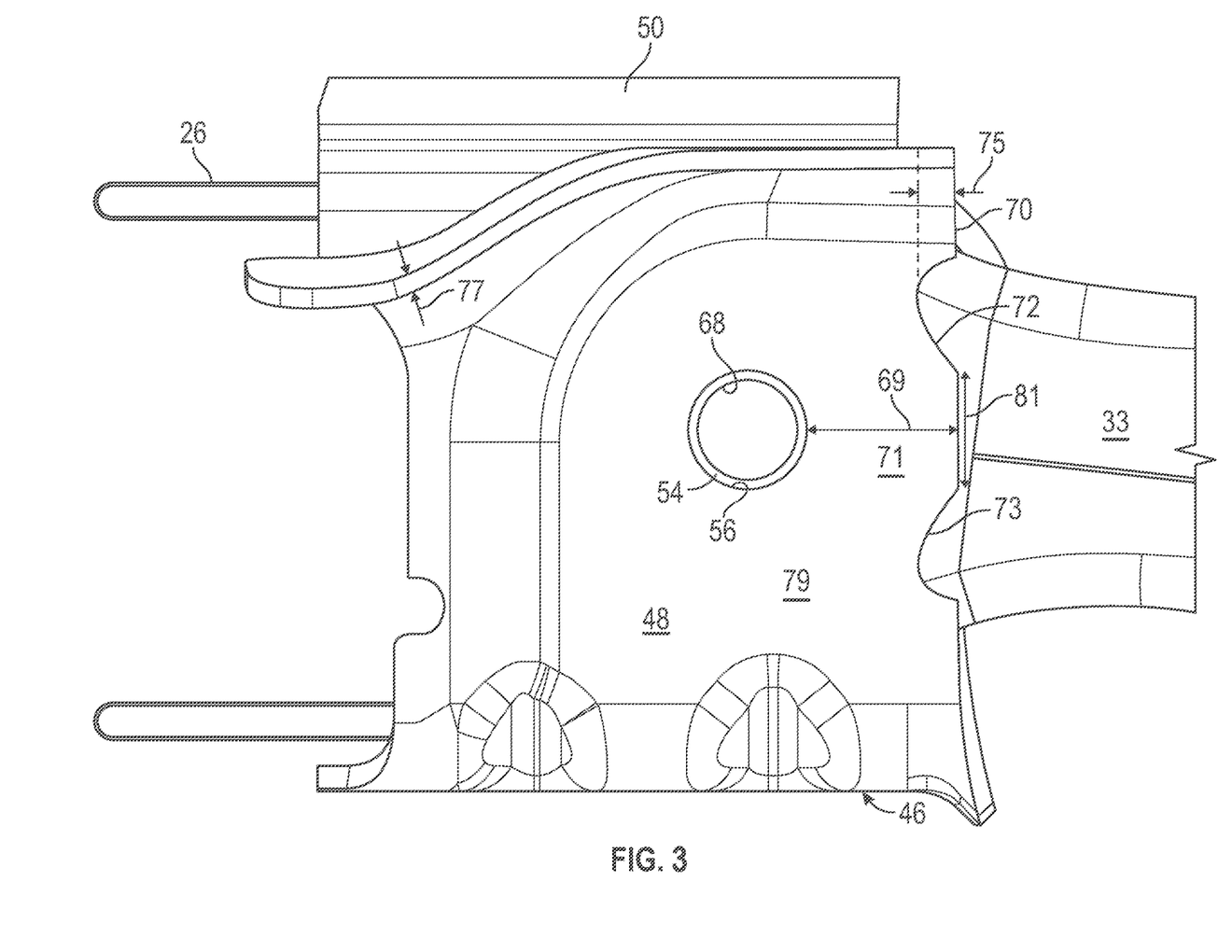
FIG. 3 is a perspective view of the lower control arm joint of FIG. 2 with the bolt omitted for visibility, in accordance with various embodiments.

Referring to FIG. 3, the joint 60 is shown with the bolt 58 omitted for visibility of the opening 56. The opening 56 extends completely through the forward flange 48 and is generally circular in shape. The opening 56 is aligned with an opening 68 that extends through the bushing 54. The opening 68 is sized to receive the bolt 58, and the opening 56 is sized to receive the bolt 58 with a small amount of clearance. The opening 56 is disposed (in its entirely), at a distance 69 from the edge 70 of the forward flange 48, leaving an area 71 of material between the opening 56 and the edge 70. A pair of notch-like undercuts 72, 73 are spaced apart by a spacing 81, and are formed in the edge 70. The undercuts are configured as concave cutouts through the edge 70 that reduce the distance of material of the forward flange 48 that remains in the area 71 from the opening 56 to the edge 70 in their locations. The depth 75 of the undercuts 72, 73 from the edge 70 is one factor in defining the performance of the joint 60 with regard to designed-in fracture/tearing of the material of the bracket 46. Additional factors include the material gage 77 or thickness of the material from which the bracket 46 is made, along with the grade 79 of the material. For example, the grade may refer to the physical properties of the material that determines is performance and strength. The distance 69 between the opening 56 and the edge 70, the locations of the undercuts 72, 73 in relation to the opening 56, the depth 75 of the undercuts 72, 73, the material gage 77 and the material grade 79 may each be tuned to selectively provide desirable wheel kinematics in a wide range of performance cases. The distance 69, the material gage 77 and the material grade 79 may be selected for durability and other desirable performance characteristics over a wide range of performance cases, while the locations of the undercuts 72, 73 and the depth 75 may be selected to deliver desirable results for a SOF case.

Figure 4:
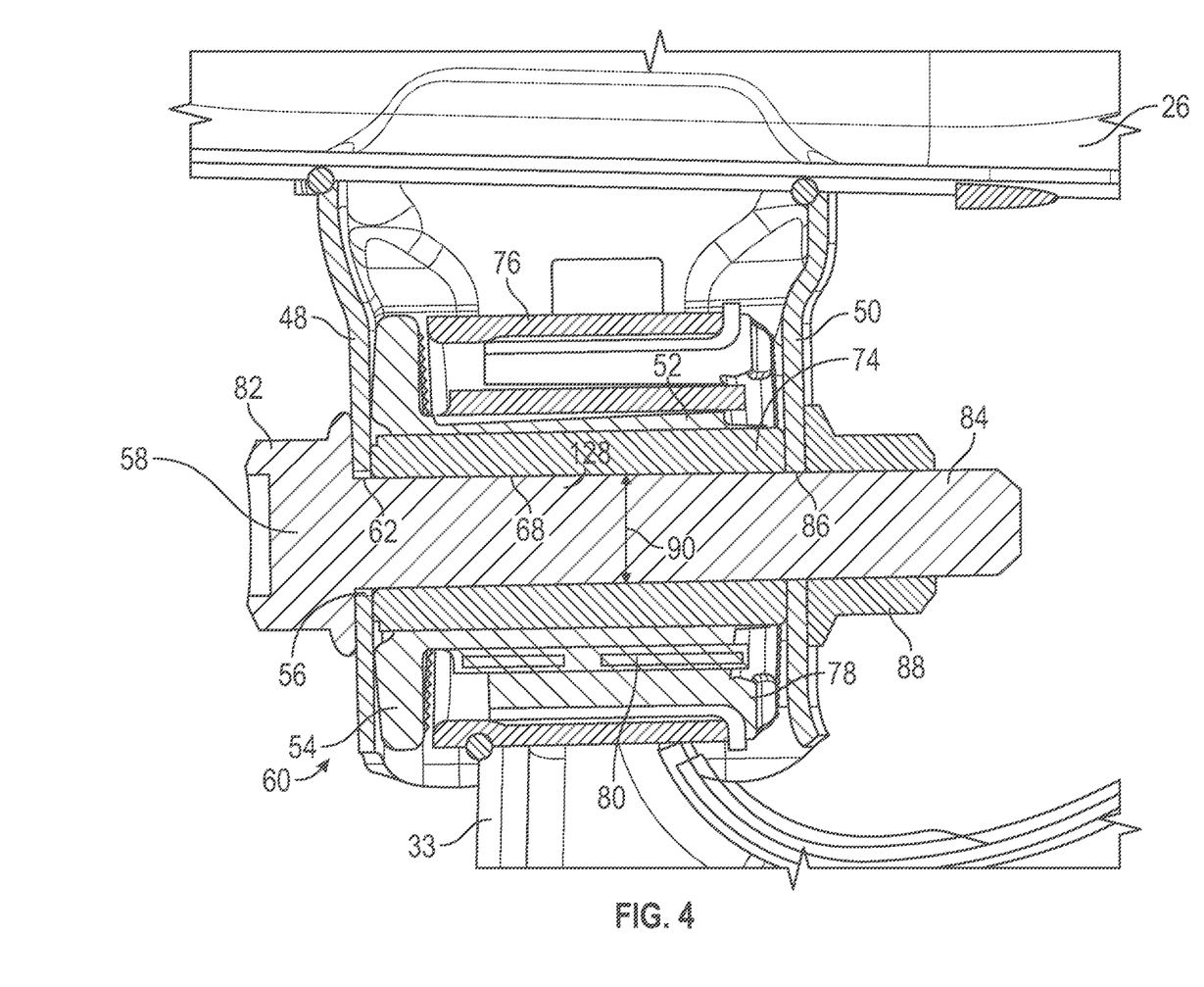
FIG. 4 is a cross sectional illustration taken generally through the line 4-4 indicated in FIG. 1, in accordance with various embodiments.

In FIG. 4, the joint 60 is shown in a sectioned and assembled form. The bushing 54 comprises an assembly with an inner sleeve 74, an outer sleeve 76, a resilient element 78 and stiffeners 80. The bushing 54 fits between the forward flange 48 and the rearward flange 50 with inner sleeve 74 defining the opening 68. The rearward flange 50 defines an opening 86 that is aligned with the opening 68. The bolt 58 includes a head 82 and a shaft 84 that extends through each of the openings 56, 68 and 86. The bolt 58 is secured by the head 82 and a nut 88 threaded onto the shaft 84, with the shaft 84 disposed in the main region 62. The shaft 84 of the bolt 58 has a diameter 90. The spacing 81 between the undercuts 72, 73 is equal, or approximately equal, in size to the diameter 90 of the bolt 58 so that the shaft 84 is normally retained within the bracket 46 under most load conditions encountered by the vehicle 20.

Figure 5:
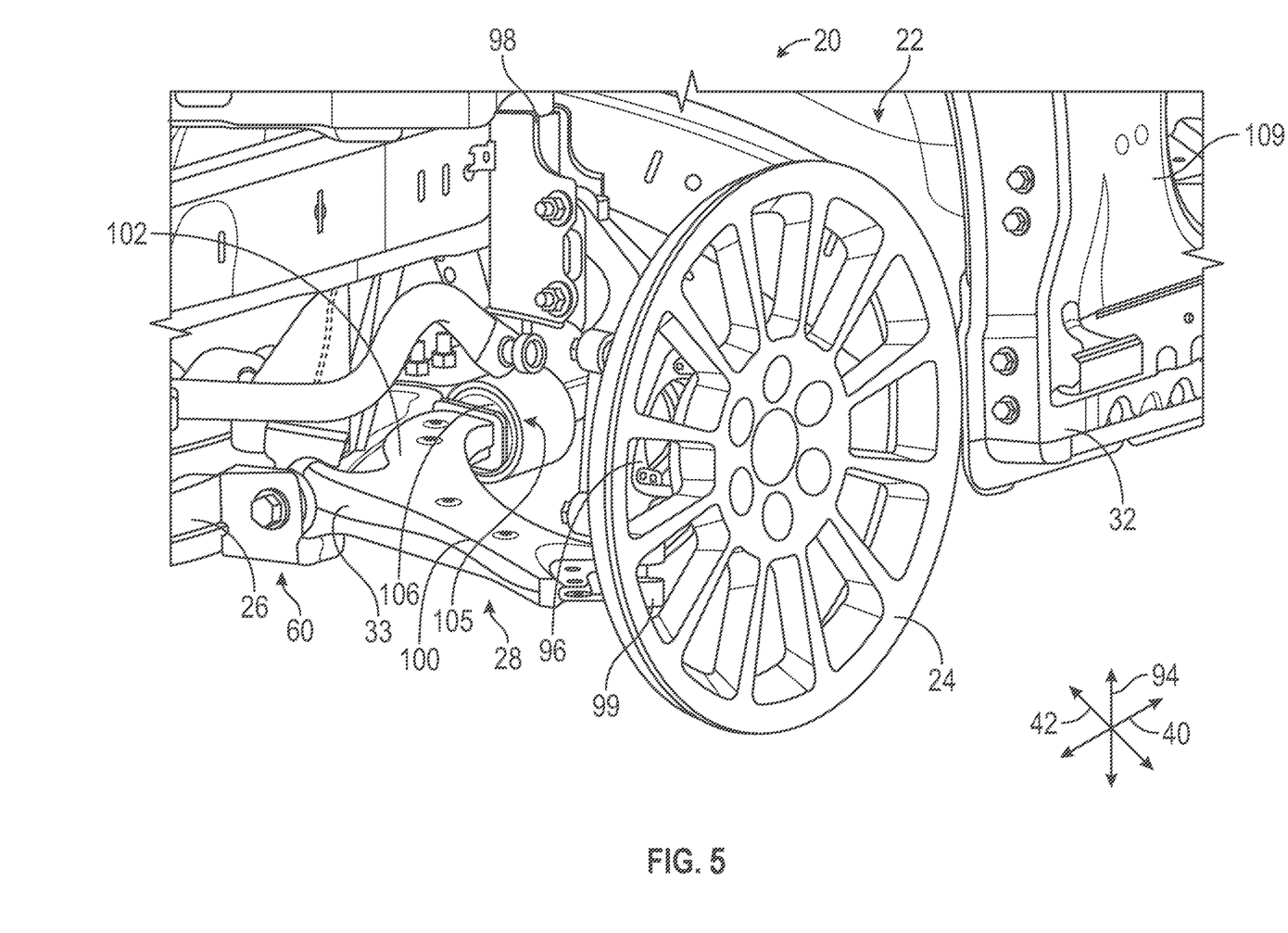
FIG. 5 is a schematic perspective illustration of the vehicle of FIG. 1 in a normal suspension state, in accordance with various embodiments.

The joint 60 is illustrated schematically along with other details of the vehicle 20 in FIG. 5, to which reference is directed. In the current embodiment, the suspension system 28 is a strut type of construction which controls movement of the wheel assembly 24 in the longitudinal direction 40, the lateral direction 42 and in a vertical direction 94. The left front wheel assembly 24 is illustrated as an example. The current disclosure is not limited to a specific type of suspension or wheel location but rather is broadly applicable to applications where releasable linking for kinematics is desirable. The wheel assembly 24 is coupled with a steering knuckle 96 to which a strut type damper 98 is attached for controlling vertical displacements. The lower control arm 100 is a link, or multiple links, that connect between the steering knuckle 96 and the engine cradle 26 and is embodied as a wishbone type element that combines the link 33 with another link 102. The link 102 is connected with the engine cradle 26 at a joint 105 through a bushing 106, and controls movement of the wheel assembly 24 in the longitudinal direction 40. The link 33 and the joint 60 control movement of the wheel assembly 24 in the lateral direction 42. The lower control arm 100 is connected with the steering knuckle 96 at a ball joint 99. The suspension system 28, including the joint 60, remains intact and functional throughout most operational scenarios of the vehicle 20, including CAL type cases, absorbing and managing inputs to/through the wheel assembly 24.

Figure 6:
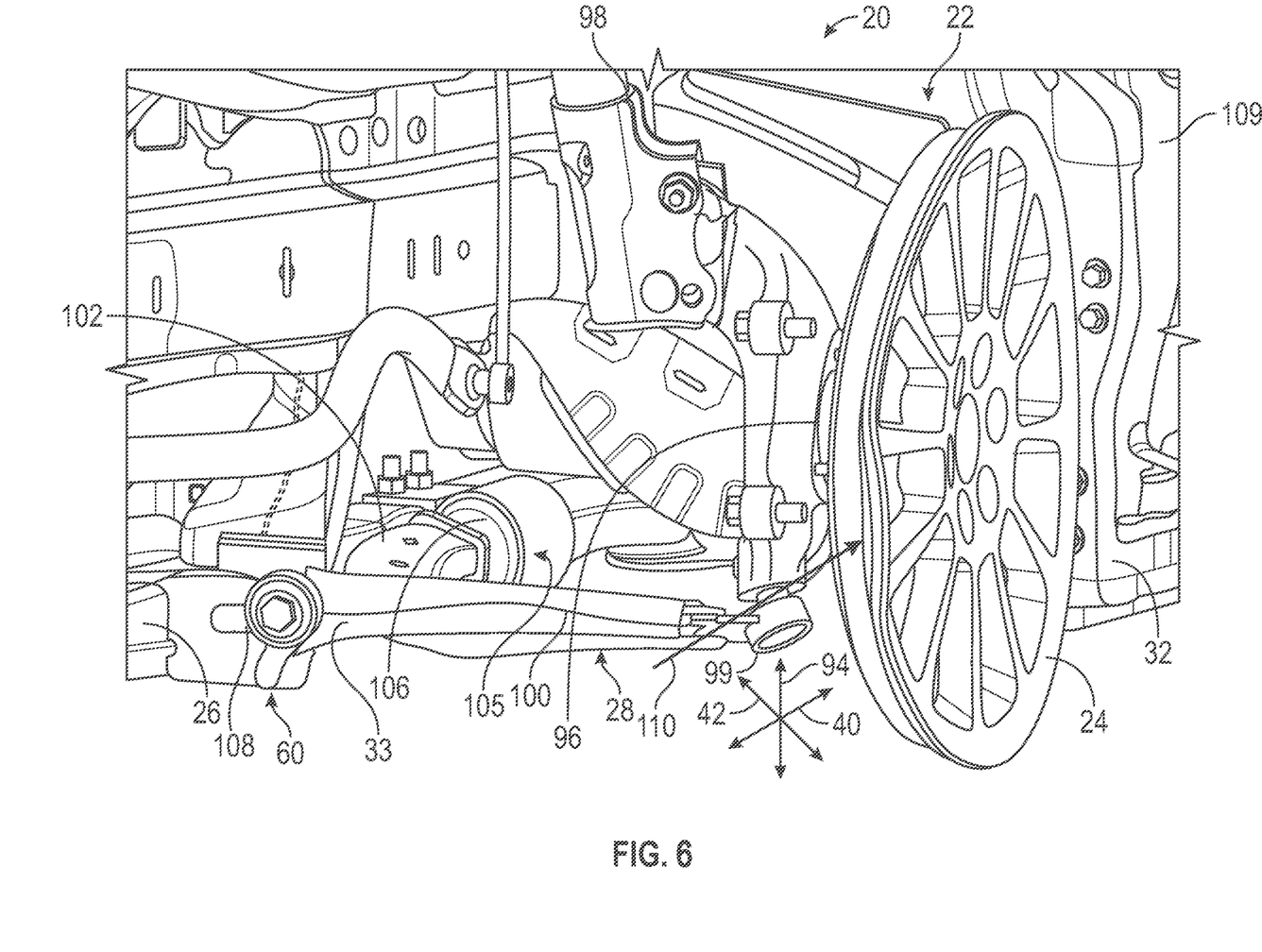
FIG. 6 is a schematic perspective illustration of the vehicle of FIG. 1 in a releasing suspension state, in accordance with various embodiments.
Figure 7:
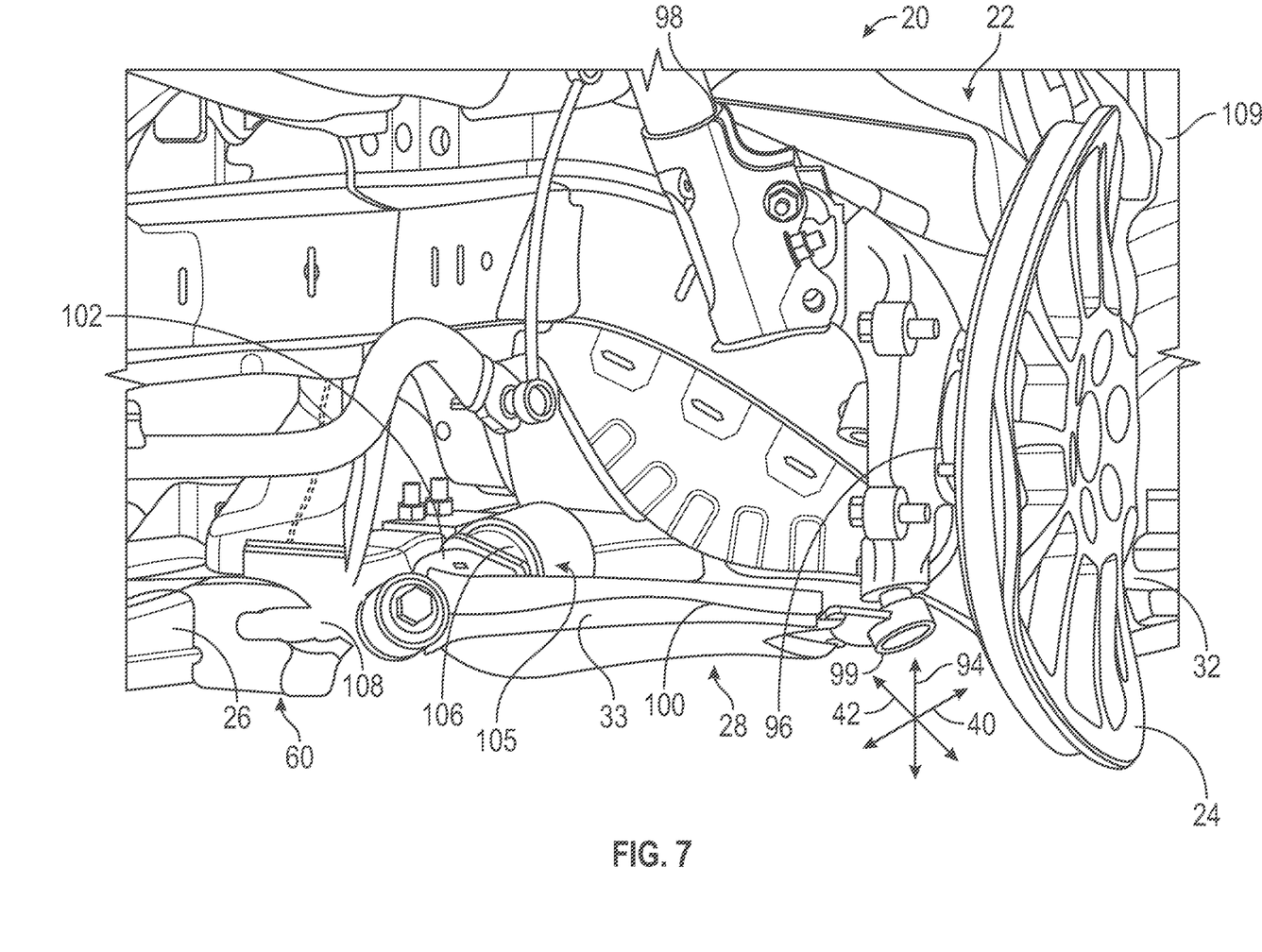
FIG. 7 is a schematic perspective illustration of the vehicle of FIG. 1 in a released suspension state, in accordance with various embodiments.

Referring additionally to FIG. 6, operation of the vehicle in a SOF type case is illustrated. A load 110 imparted on the wheel assembly 24 in the SOF type case applies a force on the joint 60, which includes a lateral component that pulls the shaft 84 of the bolt 58 in the lateral direction 42 and outward in relation to the vehicle 20 opening a tear-out area 108. Referring additionally to FIG. 7, the force transferred through the bolt 58 fractures/tears, through tear-out area 108, as the forward flange 48 releases the link 33 from the engine cradle 26. The bolt 58 may continue to tear through the rearward flange 50. The released link 33, which previously maintained position of the wheel assembly 24 in the lateral direction 42, allows the wheel assembly 24 to move laterally outward, so the wheel assembly 24 is directed through a trajectory into the rocker 32, which extends across the bottom of door opening 109. The resulting wheel kinematics allow the rocker 32 to absorb the impact of the load 110 with minimized deformation to the body structure 22 of the vehicle 20.

Figure 8:
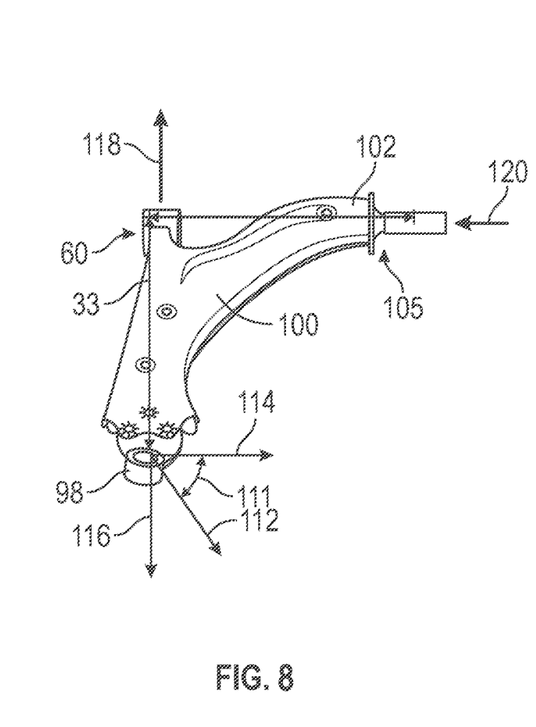
FIG. 8 is a schematic illustration of suspension loads for the vehicle of FIG. 1, in accordance with various embodiments.

Certain loads on the LCA 100 are schematically illustrated in FIG. 8, to which reference is additionally directed. A ball joint load 112 ($F_a$) at an angle 111 ($\alpha$), is imparted on the LCA 100, which has a component 114 ($F_x$), in the longitudinal direction 40 and a component 116 ($F_y$), in the lateral direction 42. The component 116 is managed by the joint 60 as indicated by an offsetting reaction force 118 ($F_r$), in the lateral direction 42. The component 114 is managed by the joint 105 as indicated by an offsetting reaction force 120 in the longitudinal direction 40. The joint 60 is designed to withstand magnitudes of the reaction force 118 for all expected normal operational conditions of the vehicle 20, including CAL type cases, and is designed to provide a managed release in the event of any SOF type cases to provide favorable kinematics of the wheel assembly 24.

Figure 9:
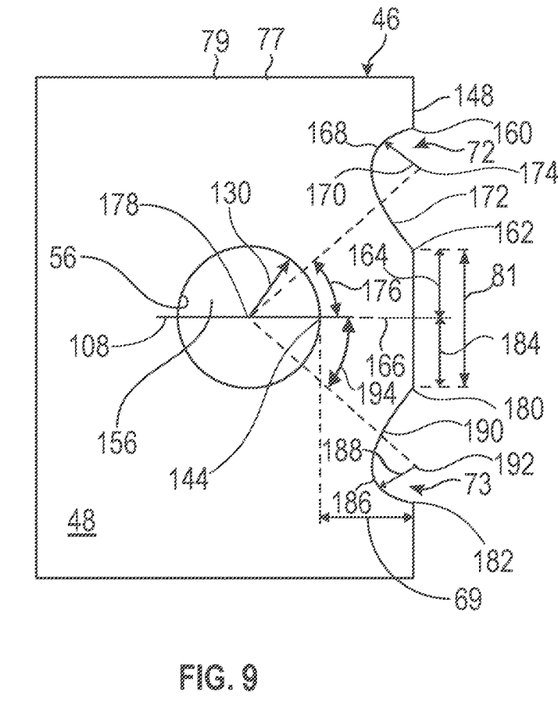
FIG. 9 is a detail view of the forward flange opening of the bracket of FIG. 2, in accordance with various embodiments.
Figure 10:
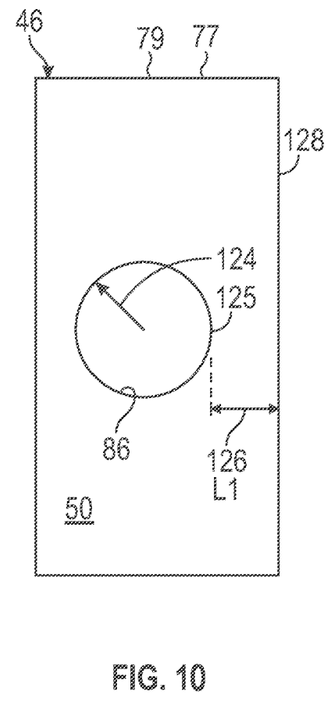
FIG. 10 is a detail view of the rearward flange opening of the bracket of FIG. 2, in accordance with various embodiments.

Referring to FIGS. 9 and 10, certain design parameters of the bracket 46 are identified. The forward flange 48 includes the opening 56, and the rearward flange 50 includes the opening 86. The flanges 48, 50 have a material composition (grade 79) and thickness (gage 77) selected for performance parameters including a stiffness and a strength required for the application. The opening 86 has a radius 124 (R1) and is located a distance 126 (L1) from the outboard edge 128 of the rearward flange 50. Specifically, the outboard end 125 of the opening 86 is located the distance 126 from the outboard edge 128. The outboard edge 128 of the rearward flange 50 remains free of undercuts in this embodiment and so is substantially straight—meaning it is free of undercuts. The radius 124 is selected to receive the shaft 84 of the bolt 58 and the distance 126 is selected to provide a strength, along with the material thickness and composition, to withstand design forces, while enabling a release in SOF type cases. The opening 56 includes a radius 130 (R2). The opening 56, and specifically its outboard end 144, is located a distance 186 (L3) from the outboard edge 148 of the forward flange 48 defining the area 71 (tear-out area).

The undercut 72 is formed from an upper end 160 at the outboard edge 148 to a lower end 162 also at the outboard edge 148. The lower end 162 is located a distance 164 above the centerline 166 of the opening 56. The contour of the undercut 72 includes an arc section 168 formed by a radius 170, and a straight section 172. The arc section 168 extends from the upper end 160 to the straight section 172. The straight section 172 may be substantially straight or may have a slight arc and extends from the arc section 168 to the lower end 162. The location of the lower end 162 and the point at which the arc section 168 transitions to the straight section 172 may be selected so that the bushing 54 is not exposed in the area of the undercut 72. The arc section 168 is defined by the radius 170 is defined about a center 174. The center 174 is located along a line disposed at an angle 176 from the center 178 of the opening 56. The angle 176 is measured from the centerline 166 of the opening 56. The angle 176 and the distance from the center 178 to the center 174 are determined to deliver the desired performance outcome (tear-out) in the SOF case scenario and similar occurrences, while maintaining integrity in all other performance cases.

The undercut 73 is configured as a mirror-image of the undercut 72 below the centerline 166 in this embodiment. In other embodiments, the contour of the undercut 73 may differ from that of the undercut 72, for example for performance outcomes or due to other componentry requirements. The undercut 73 extends from an upper end 180 to a lower end 182. The upper end 180 is disposed the distance 81 from the lower end 162 of the undercut 72 and a distance 184 below the centerline 166. In this embodiment, the distance 184 is equal to the distance 164. The contour of the undercut 73 includes an arc section 186 formed by a radius 188, and a straight section 190. The arc section 186 extends from the lower end 182 to the straight section 190. The straight section 190 may be substantially straight or may have a slight arc and extends from the arc section 186 to the upper end 180. The location of the lower end 182 and the point at which the arc section 186 transitions to the straight section 190 may be selected so that the bushing 54 is not exposed in the area of the undercut 73. The arc section 186 is defined by the radius 188 and is defined about a center 192. The center 192 is located along a line disposed at an angle 194 from the center 178 of the opening 56. The angle 194 is measured from the centerline 166 of the opening 56. The angle 194 and the distance from the center 178 to the center 192 are determined to deliver the desired performance outcome (tear-out) in the SOF case scenario and similar occurrences, while maintaining integrity in all other performance cases.

In determining of design parameters of the suspension system 28, and particularly of the bracket 46 and the LCA 100, various conditions are considered including sustained integrity of the suspension system 28, buckling (bending of the material), of the LCA 100, and separation of the joint 60. For ball joint load angles 111 ($\alpha$), of up to a threshold angle, such as fifty-degrees, and of a sufficient force, design conditions of buckling of the LCA 100 are selected with integrity of the joint 60 being maintained. This selection is consistent with operational conditions of scenarios other than SOF type cases, including CAL type cases. For SOF type cases of a sufficient force where the ball joint load angle 111 ($\alpha$) is above the threshold angle, separation of the joint 60 is prescribed.

Ball joint loads 112 ($F_a$) of sufficient magnitude are designed to result in buckling of the LCA 100 at various ball joint load angles 111. Accordingly, the joint 60 withstands the encountered forces without release, including for CAL type cases. For SOF type cases, the joint 60 is configured to release the link 33 from the vehicle's engine cradle 26 under loads above a threshold force and above a threshold angle at the ball joint 99. Selecting the design parameters described above for the bracket 46 deliver these desired performance characteristics.

The strength of the suspension system 28 maintains integrity against buckling and/or release with a margin for CAL type and general durability cases. In other words, peak loads for CAL type cases are well below those that would be required for buckling of the LCA 100 or for release of the joint 60, and so the suspension system 28 remains functionally and structurally intact. The material and thickness (gage 77), grade 79 of the bracket 46, and the design of the undercuts 72, 73 are selected so that the loads expected in SOF type cases will result in release of the joint 60. This is indicated by ball joint loads 112 above one-hundred kilonewtons for ball joint load angles 111 above the threshold angle, and the LCA 100 buckles first prior to release of the joint 60.

Accordingly, systems are provided where joint release occurs under select conditions to provide preferred wheel kinematics and minimize/control vehicle body structural damage. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A system comprising:
   a vehicle body structure with an engine cradle;
   a wheel assembly;
   a suspension system linking the wheel assembly to the engine cradle, including a link coupled with the vehicle body and coupled with the wheel assembly; and
   a joint at the link, the joint including a bracket with a flange that has an opening, an edge disposed at an outboard end of the flange, a first undercut defined in the edge, the first undercut disposed laterally outward from the opening and disposed offset a first distance above a centerline of the opening in a vertical direction, and a second undercut defined in the edge, the second undercut disposed laterally outward from the opening and disposed offset a second distance below the centerline of the opening in the vertical direction,
   wherein the joint is configured to release, by tearing between the opening and the edge of the flange at at least one of the first undercut and the second undercut, the wheel assembly from the engine cradle under loads above a select threshold at the joint, to provide select kinematics of the wheel assembly.

2. The system of claim 1, wherein the link comprises a lower control arm configured to control movement of the wheel assembly relative to the vehicle body structure in both a longitudinal direction and a lateral direction.

3. The system of claim 1, wherein the joint includes a bolt that has a diameter and that extends through the link and through the opening, wherein the first undercut is separated from the second undercut along the edge by a spacing, wherein the spacing is approximately equal in size to the diameter of the bolt.

4. The system of claim 1, comprising a steering knuckle connected between the wheel assembly and the link, wherein a second joint is formed between the link and the steering knuckle, wherein the second joint is a ball joint at the steering knuckle and wherein the select threshold includes a force and includes a threshold angle of approximately fifty degrees relative to a longitudinal direction of the vehicle body structure.

5. The system of claim 1, wherein the bracket is in the vehicle body structure, wherein the bracket includes the flange as a forward flange defining the opening as a first opening and the bracket includes a rearward flange defining a second opening, wherein the rearward flange includes the edge as an outer edge that is substantially straight.

6. The system of claim 5, wherein the edge of the forward flange includes an outboard end and a tear-out section between the first opening and the outboard end, the tear-out section configured to tear from the forward flange when subjected to the loads at a level above a threshold force and when subjected to the loads at a direction above a threshold angle at the joint.

7. The system of claim 1, comprising a rocker in the vehicle body structure, the rocker configured with strength in a longitudinal direction of the vehicle body structure, wherein the select kinematics comprise directing the wheel assembly through a trajectory directed at the rocker in the longitudinal direction.

8. The system of claim 1, wherein:
   the joint and the link are configured to maintain connection between the link and the bracket when the loads are under a threshold force, with the link buckling when the loads are above a link buckling force and an angle at the joint is less than a threshold angle, and the joint and the link are configured to release the link from the bracket when the loads are above the threshold force and the angle is greater than the threshold angle.

9. The system of claim 1, wherein the second undercut is configured as a mirror-image of the first undercut.

10. The system of claim 9, wherein the first undercut includes an arc section defined about a point that is disposed at an angle relative to the centerline of the opening, wherein the angle is selected to effect the tearing under the loads above the select threshold at the joint.

11. A system comprising:
a vehicle body structure;
a wheel assembly; and
a suspension system linking the wheel assembly to the vehicle body structure, including a link coupled with the vehicle body structure by a first joint and coupled with the wheel assembly through a second joint, the first joint including a bracket with a flange that has an opening, an edge, and at least one undercut defined in the edge of the flange, the at least one undercut disposed laterally outward from the opening,
wherein the first joint is configured to release, by a tear of the bracket laterally outward from the opening to the at least one undercut, the link from the vehicle body structure under loads on the wheel assembly above a select threshold, the select threshold including a threshold force and a threshold angle of the threshold force at the second joint, to, when the release occurs, impart select kinematics to the wheel assembly including directing the wheel assembly through a trajectory selected to minimize deformation of the vehicle body structure,
wherein the first joint is configured to prevent the release without the tear when the loads are below the select threshold.

12. The system of claim 11, wherein the link comprises a lower control arm configured to control movement of the wheel assembly relative to the vehicle body structure in both a longitudinal direction and a lateral direction, wherein the lower control arm is coupled to the vehicle body at the first joint and at a third joint.

13. The system of claim 11, wherein the at least one undercut comprises a notch-like contour in the edge of the flange and is defined by an arc section and a substantially straight section leaving an area of a material of the flange between the opening and the edge, and comprising a bushing coupled to the flange, the bushing concealed behind the flange by the area.

14. The system of claim 11, wherein the second joint is a ball joint enabling the wheel assembly to turn relative to the vehicle body, and wherein the threshold angle is fifty degrees relative to a longitudinal direction of the vehicle body structure.

15. The system of claim 11, wherein the flange is configured as a forward flange defining the opening as a first opening and the bracket includes a rearward flange defining a second opening, wherein the rearward flange includes the edge as an outer edge that is substantially straight, wherein the loads above the select threshold are configured to tear both the forward flange and the rearward flange.

16. The system of claim 15, wherein the edge of the forward flange includes an upper end at the at least one undercut and a lower end at the at least one undercut, and a tear-out section between the first opening and the at least one undercut, the tear-out section configured to tear from the first opening to the edge between the upper end and the lower end, when subjected to the loads above the threshold force and above the threshold angle.

17. The system of claim 11, comprising a rocker in the vehicle body structure, the rocker having a front end facing the wheel assembly and the rocker configured with strength in a longitudinal direction of the vehicle body structure, wherein the select kinematics comprise directing the wheel assembly through the trajectory directed in the longitudinal direction at the front end of the rocker.

18. The system of claim 11, wherein the link is configured to buckle without the release of the link, under the loads without the release of the link, when the loads are greater than a buckling force of the link, and when the loads are also directed at angles at the first joint, relative to a vehicle longitudinal direction, of less than the threshold angle.

19. The system of claim 11, wherein the at least one undercut comprises a first undercut and a second undercut, the first undercut and the second undercut spaced apart by a vertical distance across a centerline of the opening, wherein the first undercut includes an arc section defined about a point that is disposed at an angle relative to the centerline of the opening, wherein the angle is selected to effect the tearing under the loads above the select threshold at the first joint.

20. A system comprising:
a vehicle body structure including an engine cradle, a rocker and a bracket;
a wheel assembly linked with the vehicle body structure at the engine cradle; and
a suspension system linking the wheel assembly to the vehicle body structure, including a link coupled with the engine cradle at the bracket by a first joint and coupled with the wheel assembly through a second joint,
wherein the bracket includes a flange with an opening and an outer edge spaced from the opening, the opening defined about a center,
wherein the bracket includes a first undercut defined in the outer edge, the first undercut disposed laterally outward from the opening and disposed offset a first distance above the center of the opening in a vertical direction, and a second undercut defined in the outer edge, the second undercut disposed laterally outward from the opening and disposed offset a second distance below the center of the opening in the vertical direction,
wherein the first joint is configured to release, by tearing of the flange, the link from the engine cradle under loads on the wheel assembly above a threshold force and above a threshold angle of the threshold force at the second joint, to impart select kinematics to the wheel assembly including directing the wheel assembly through a trajectory toward the rocker to minimize deformation of the vehicle body structure.

* * * * *